Dec. 31, 1957    R. B. CRANDELL ET AL    2,818,550
CAPACITIVE SCANNING APPARATUS
Filed Oct. 1, 1945

Inventors:
Robert B. Crandell,
Billy R. Shepard,
Henry C. Maulshagen,
by Merton D Morse
Their Attorney.

2,818,550
CAPACITIVE SCANNING APPARATUS

Robert B. Crandell, Billy R. Shepard, and Henry C. Maulshagen, Schenectady, N. Y., assignors to General Electric Company, a corporation of New York Application October 1, 1945, Serial No. 619,725

8 Claims. (Cl. 333—24)

This invention relates to scanning apparatus and particularly to such apparatus for scanning a plurality of sources of relatively weak electric signals.

In certain types of signal portraying equipment, and particularly in such equipment which employs a cathode ray tube for visually portraying an outline or shadowgraph of an object, it is necessary to provide a device for conducting signals from a large number of signal sources in a predetermined order to the portraying apparatus. The signals received by this type of apparatus, particularly when the signals are echoes of corresponding signals sent out by the transmitting device of the apparatus, often are very weak and it becomes difficult to scan the signal elements with a mechanical device, particularly when contact members such as slip rings or the like are employed; the rubbing contact necessary in mechanical scanners results in the production of noise which interferes with the reception of the signals. It is an object of this invention to provide an improved device for scanning a plurality of signal sources.

It is another object of the invention to provide a device for scanning a plurality of signal sources including an improved arrangement for capacitively coupling the signal sources with a common signal receiving element in a predetermined order.

Figure 1:
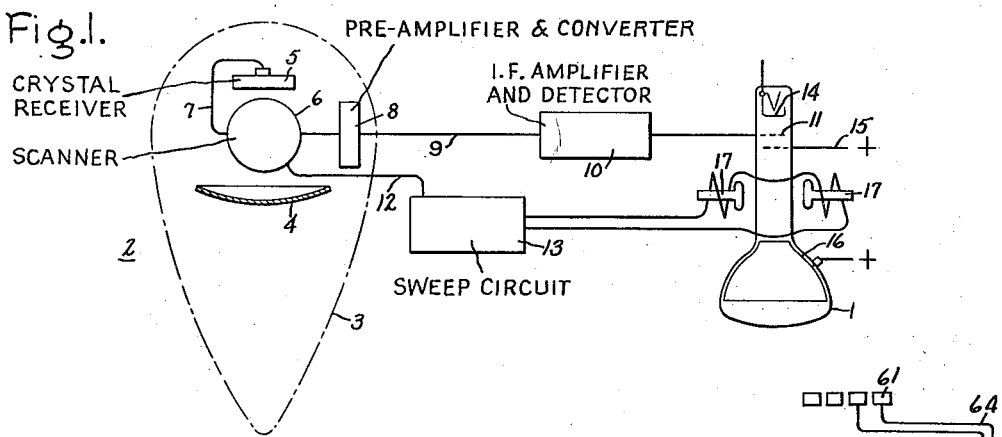
Figure 2:
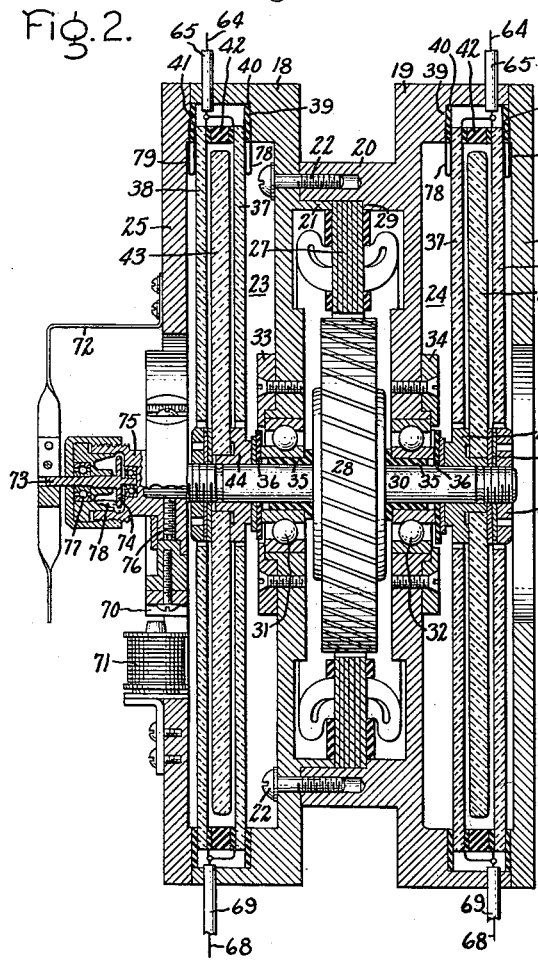
Figure 3:
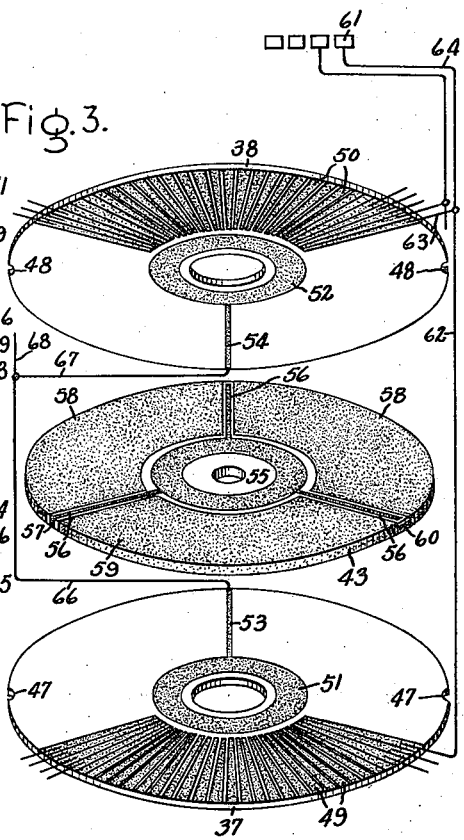

The novel features which are believed to be characteristic of the invention are set forth with particularity in the appended claims. The invention itself, however, both as to its organization and method of operation, together with further objects and advantages thereof, may best be understood by reference to the following description taken in connection with the accompanying drawing in which Fig. 1 represents diagrammatically a signal receiving and portraying apparatus utilizing a scanning device embodying the invention; Fig. 2 is a detail sectional view of the scanning device removed from its waterproof casing; and Fig. 3 is an exploded perspective view of the scanning plates employed in the device of Fig. 2.

Referring now to Fig. 1, a cathode ray tube 1 is arranged to portray signals received by a receiving apparatus generally indicated at 2. The apparatus illustrated is of the type employed to receive underwater sound signals and comprises a casing, indicated by the broken line 3, which is located under water. A receiver assembly which includes a parabolic reflector 4 and a transducer 5 is arranged to be rotated within the casing 3 and to receive signals from an area in front of the casing during a predetermined number of degrees of each revolution of the assembly. The transducer 5 is provided with a row or line of piezoelectric crystals and is arranged in front of the reflector so that the crystals lie in a line generally parallel to the axis of rotation. The crystals receive signals corresponding to a plurality of points in the area under examination and lying in a line transverse to the plane of rotation. For example, if the movement of the receiver about the axis of rotation represents horizontal movement over the area under examination, the line of crystals represents a series of positions along a line in that area. By scanning the line of crystals rapidly as the receiver is rotated, it is possible to examine the entire area, each crystal receiving a signal representing the condition in one spot of that area. In order to scan the crystals successively and rapidly, an electrostatic scanner arranged in a waterproof casing 6 is mounted in the receiver assembly and is connected to the crystals in the housing 5 through a cable or conduit 7 containing separate insulated conductors for each of the several crystals. The operation of the scanner supplies the signals from the crystals successively to a preamplifier and converter 8 which is also a part of the rotating receiver assembly. The signals are amplified successively by the amplifier 8 and are converted to a lower frequency and transmitted along a cable 9 from the housing 9 to an amplifying apparatus 10 including an intermediate frequency amplifier and detector. The signals are then impressed on a control grid 11 of the tube 1 to control the intensity of the electron beam of the tube. There is also included in the scanner housing 6 a device for producing synchronizing pulses indicating the position of the scanner with respect to the line of receiving elements in the transducer 5, and these synchronizing pulses are supplied through a cable 12 to suitable sweep circuits 13 which sweep the cathode ray beam in the tube 1 radially in synchronism with the scanning of the line of crystal elements. The cathode ray beam in the tube 1 is produced in the usual manner by operation of a heated cathode 14, a first anode 15 and a second anode 16. Since the receiving apparatus is rotated, it is also necessary to represent this rotation on the screen of the cathode ray tube and this is accomplished in a manner known in the art by rotating a pair of beam deflecting coils, indicated at 17, in synchronism with the rotation of the receiver so that the rotation of the beam causes the visual signals on the screen of the tube to appear in positions corresponding to the positions of the receiving assembly. The operation of the apparatus produces a shadowgraph of any object in the area under examination and indicates the approximate size and shape of the object. The signal portraying system diagrammatically shown in Fig. 1 is more fully described and is claimed in application Serial No. 619,720, filed concurrently herewith in the name of Cramer W. LaPierre et al. and assigned to the same assignee as the present invention.

Fig. 1 represents the receiving portion of an apparatus which is arranged to transmit supersonic sound vibrations under water and the signals received by the transducer 5 are echoes reflected from objects in the path of the transmitted sound waves. These sound signals are necessarily very weak and the corresponding electric currents set up by vibration of the crystals in the transducer 5 are extremely small. It is, therefore, necessary to pick up the signals and to transmit them to the amplifying apparatus with minimum loss or interference. If sliding contact devices are employed to scan the several crystals in turn, interference noise results from the mechanical movement and such scanners are unsatisfactory. The scanner within the housing 6 is of the electrostatic type which does not require rubbing engagement of moving contact members but instead successively couples each crystal capacitively to the amplifier 8.

The details of construction of the scanning device are clearly shown in Fig. 2, which is a sectional view of the device removed from the housing 6. The scanner is provided with a metal casing comprising a cylindrical box or case 18 and a similar case 19 arranged back to back with the case 18 and spaced therefrom by a flange 20 formed on the case 19 inwardly of the periphery thereof. The flange 20 engages a thin flange 21 on the case 18 and is secured to the case by a plurality of screws 22. The cases 18 and 19 are closed by plates or covers 25 and 26, respectively, to provide two chambers 23 and 24 respectively. The space between the cases 18 and 19 and enclosed by the flange 20 constitutes a motor housing, and a motor comprising a stator 27 and rotor 28 is mounted within the housing. The stator is securely held in position between the flange 21 of the case 18 and a shoulder 29 formed on the inner side of the flange 20. The rotor 28 is provided with a shaft 30 which rotates in ball bearing assemblies 31 and 32 secured in the walls of the cases 18 and 19, respectively, by rings 33 and 34 which are screwed to the walls. The shaft 30 is insulated from the bearing assembly by flanged bushings 35 and washers 36.

The inner faces of the cases 18 and 19 are of the same construction and the scanner assemblies within these housings are also of the same construction and corresponding parts have been designated by the same numerals. The purpose of providing two separate scanning assemblies in the device shown in Fig. 2 is to provide separate scanners which may connect to the amplifier 8 either of two lines of crystals mounted in the transducer 5. In this manner it is possible to provide apparatus operating at either of two frequencies. This desirable since greater detail may be secured at higher frequencies although at a sacrifice of the range at which the apparatus may operate. A greater number of crystals is employed at the higher frequency and it follows that there will be a greater number of contacts in the scanner operating at the higher frequency.

Preferably each of the scanners comprises a pair of stationary plates of insulating material on which are arranged a series of pairs of conducting elements or fingers, the fingers of each pair being directly opposite each other. These pairs of fingers are connected to the individual crystals and a rotating arm is provided which passes between the pairs of fingers and provides a capacitive coupling between the crystals and the amplifier. Each of the scanners comprises an inner stationary plate 37 and an outer stationary plate 38. These plates are constructed of glass or other suitable hard insulating material and are secured between a shoulder 39 in the respective casings and the respective one of the two covers 25 and 26; suitable resilient washers 40 and 41 are provided on the outer sides of each pair of plates, and a spacing ring and gasket assembly 42 is arranged between the plates 37 and 38 of each pair. A rotor plate 43 is arranged between each pair of stationary plates and is mounted on the shaft 30 between a hub or bushing 44 and a nut 45, washers 46 being provided between the nut and the rotor 43. The spacing between the rotor 43 and the plates 37 and 38 has been exaggerated in the drawing for purposes of illustration. In practice the plates are spaced closely and are aligned and rigidly held so that the rotors may be revolved continuously without variation of the spacing.

The arrangements and the details of the conducting plates and elements on the insulated scanning plates are shown in Fig. 3. The insulating plates 37 and 38 are provided with notches 47 and 48, respectively, to engage suitable stops or projections (not shown) which are provided in the scanner casings in order to position the plates 37 and 38. When the plates are in their correct positions, a plurality of conducting elements or radial fingers 49 on the plate 37 lie opposite a plurality of identical fingers 50 on the plate 38 so that opposite or corresponding fingers constitute pairs of opposed plates between which the plate 43 rotates. In the plates illustrated the sets or groups of fingers 49 and 50 extend for 120 degrees around the circular plate. Inwardly of the plates, the fingers terminate short of annular conducting rings or plates 51 and 52 on the plates 37 and 38, respectively. These rings are connected to the external circuit through conductors 53 and 54, respectively. The rotating plate 43 is provided with a pair of central annular rings or plates 55 which are complementary to the plates 51 and 52, one of the plates 55 being provided on each side of the plate 43. Three arms 56 spaced 120 degrees apart extend radially from the plates 55 to the edge of the plate 43 and one set of these arms extends around the edge of the plate, as indicated at 57, to provide an electrical connection between the two plates 55. The remaining two pairs of arms 56 terminate at the edge of the plate 43 and are not connected. The areas between the arms are covered by plates 58 spaced from the arms and providing equipotential areas for purposes to be pointed out later. The pairs of plates 58 on opposite sides of the plate 43 are connected by a layer of conducting material 59 extending around the edge of the plate 43. In order to connect the three pairs of plates 58 together to maintain them at the same potential, the layers 59 adjacent the two pairs of arms 56 which are not connected together are connected by conducting strips 60, one of which can be seen in the drawing.

The plates and conducting fingers may be constructed in any desired manner to insure that the conducting surfaces will lie in concentric surfaces of revolution about the axis of the shaft 30. The fingers 49 and 50 must rotate in surfaces of revolution complementary and concentric with the surface in which the arms 56 rotate, and the annular plates 51, 52 and 55, which are also complementary, must rotate in complementary surfaces of revolution. Obviously it is not necessary that the fingers and the annular plates lie in complementary surfaces of revolution; however, it is preferable to construct the scanning plates as continuous surfaces such as the disks illustrated, in which case all the conducting areas lie in similar surfaces of revolution. The conducting plates and fingers in the illustrated scanner comprise metal coatings which may be applied by any suitable process. For example, a deposit or coating of powder in a suitable binder may be applied to the plate in the desired pattern and the plate may thereafter be heated or otherwise treated to reduce the powder to metallic form so that very thin metal sheets or plates are provided on the surface of the insulating plate.

When the plates are assembled in the scanner, the fingers 49 and 50 lie closely adjacent the face of the plate 43 and the arms 56, which are somewhat narrower than the fingers 49 and 50, pass between the pairs of fingers 49 and 50 in succession. These pairs of fingers are each connected to one of the crystals in the transducer 5. Four of these crystals are indicated in Fig. 3 and the left-hand pair of fingers 49 and 50 have been shown connected through leads 62 and 63 and a conductor 64 to the crystal. The connections of the remaining fingers have not been completed since they are not necessary to an understanding of the invention. The conductor 64 is arranged in a concentric cable shown at 65 in Fig. 2, the outer conducting sheath of the cable being in electrical contact with the metal case of the scanner. The output of the scanner is taken from the conductors 53 and 54 through leads 66 and 67, respectively, to a conductor 68. The conductor 68 is provided with a concentric conducting sheath 69 which is electrically connected to the case.

It will now be apparent that upon rotation of the plate 43, whenever one of the arms 56 lies between the elements of a pair of fingers 49 and 50, the crystal connected to that pair of elements is capacitively coupled through the arms 56 and the plates 55 to the plates 51 and 52. Thus the crystal is capacitively coupled to the output 68 of the scanner and is connected to the amplifier 8. The rotation of the plate 43 carries one of the pairs of arms 56 between all the pairs of fingers 49 and 50 in succession, and since the arms 56 are spaced 120 degrees apart a second pair of arms begins to pass between the pairs of fingers just as the first pair of arms leaves the last pair of fingers. The row of crystals in the transducer 5 is thereby scanned rapidly at a speed selected by the speed of rotation of the motor 28, each revolution of the motor providing three scannings of the line of signal sources.

In order to synchronize the sweeping or deflecting of the electron beam in the tube 1 with the scanning of the line of crystals, it is necessary that the beam be deflected once for each passage of a pair of arms between the set of fingers; and, therefore, the beam is deflected three times during each revolution of the scanner. The device for supplying synchronizing pulses to the sweep circuits from the scanner includes three permanent magnets which are arranged 120 degrees apart on the rotating members of the scanner. Two of these magnets are shown at 70 on the left-hand side of Fig. 2. During the rotation of the scanner these magnets pass a pickup coil 71 and each magnet produces a voltage pulse in the coil when the corresponding arm 56 begins to sweep the radial fingers. These pulses are transmitted to the sweep circuit 13 through the cable 12 and are employed to synchronize the deflection of the cathode ray beam with the scanning of the line of crystals.

The rotary scanning plate is maintained in close proximity to both stationary plates and provides an effective capacity coupling so that weak signals can be transferred from the crystals in the transducer to the preamplifier. Interference with the signals due to stray capacity effects is further reduced by grounding all the conducting sheaths of the leads and also by maintaining at ground potential all members of the scanning device which do not form parts of the electrical circuits. The shaft 30 is maintained at ground potential for this reason, it being connected to cover the case 18 through a conducting strap 72. A contact member 73 having a disk portion 74 is secured to the strap and is connected to the shaft through a mercury contactor arranged on an attachment 75 secured to the left end of the shaft by a set screw 76. The contact member 73 is mounted in ball bearing assemblies 77 so that the attachment 75 may rotate freely with minimum interference. A small quantity of mercury is contained in a well or chamber 78 formed in the attachment 75 so that the mercury is thrown out by centrifugal force and maintains contact with the periphery of the disk 74 during rotation of the scanner. By providing good contact between the rotating shaft and the case, the shaft is maintained at ground potential and the building up of charges which might cause interference with the signals is avoided.

Another arrangement for facilitating the reception of undistorted signals by the amplifier is the provision of the pairs of plates 58 on the rotor 43 which are all maintained at the same potential. These plates lie opposite all of the fingers 49 and 50 which are not at the moment being scanned by one of the arms 56, and charges on the remaining plates are therefore not effective to cause cross talk interfering with the signal from the pair of fingers coupled to the amplifier. It has also been found that cross talk can be further reduced by providing a metallic coating on the outer sides of the plates 37 and 38 and by connecting these conducting areas to the grounded casing through strips of foil or other suitable conductors 78 and 79.

During the operation of the apparatus described, the scanning motor 28 is rotated at a predetermined speed to provide the required number of transverse lines for forming a shadowgraph when the receiver assembly is rotated at its selected speed. During that portion of each revolution of the receiver assembly when the transducer 5 is receiving signals, the scanning of the elements of the transducer produces successive transverse lines of signal points on the fluorescent screen of the tube 1, these lines being radial with respect to the tube centerline. Whenever a signal is received from a remote object, the intensity of the beam is increased and a bright spot appears on the screen at a point corresponding to the position of the portion of the object from which the signal is received. The successive signals produce a large number of bright spots forming an outline or shadowgraph of the entire object on the screen.

By providing two stationary plates so that the fingers may be connected in pairs, it is possible to employ a considerably smaller scanner than would be necessary if single plates were employed. The arrangement whereby the signals are coupled from the fingers on the stationary plates to the arms and rings on the rotating plate and thence back to the rings on the stationary plates provides a simple and effective scanner which may be constructed ruggedly and provides the required ease of adjustment necessary to maintain the close spacing between the plates. The entire structure is easily assembled and may readily be taken apart for inspection or servicing.

While the invention has been described in connection with a particular type of cathode ray apparatus for receiving underwater sound signals, other applications will readily be apparent to those skilled in the art. Therefore it is not desired that the invention be limited to the specific construction illustrated and described and it is intended by the appended claims to cover all modifications which fall within the spirit and scope of the invention.

What we claim as new and desire to secure by Letters Patent of the United States is:

1. A device for scanning a plurality of signal points comprising a pair of relatively rotatable members, a conducting plate on the first of said members near the center thereof, a plurality of radially extending conducting fingers on said first member and insulated from said plate and from each other, means for connecting said fingers to corresponding signal points to transfer signal energy between said points and said fingers, a complementary conducting plate on said second member and a conducting arm connected to said complementary plate and extending radially therefrom, said complementary plate and said arm being closely spaced from said first plate and said fingers whereby each of said fingers may be coupled capacitively to said first plate through said arm and said complementary plate and upon relative rotation of said members said arm passes successively over said fingers and transfers signal energy between said first plate and said fingers, and a signal conducting connection for said first plate.

2. A device for scanning a plurality of sources of signal energy comprising one member having a plurality of equally spaced radial arms of conducting material lying in a common surface of revolution, a second member having a series of equally spaced conducting elements arranged in a surface of revolution spaced from said first mentioned surface and having the same axis, the distance between the first and last of said elements being no greater than that between adjacent ones of said radial arms, a plate on said one member near the center thereof and connected to said arms, a complementary plate on said second member mounted for rotation at a fixed distance from said first plate and insulated from said series of elements, means for connecting each of said elements to a signal source to conduct signal energy to said elements, means for imparting relative rotation to said members whereby said arms transfer the signal energy from said elements successively to said complementary plate, and output means for conducting the signal energy from said complementary plate.

3. A device for scanning a plurality of sources of signal energy comprising a pair of relatively rotatable members constructed of insulating material, metallic coatings on said members forming a plurality of separate elements and a plate on one member and an arm and a complementary plate on the other member, said arm and said complementary plate being electrically connected, said coatings being arranged on surfaces of revolution about the axis of relative rotation of the members and the adjacent surfaces of said members being closely spaced whereby said elements may successively be coupled capacitively to said first mentioned plate and signal energy may be transferred successively from said elements to said first plate, and means for conducting the signal energy from said first plate.

4. A device for scanning a plurality of sources of signal energy comprising a pair of relatively rotatable members constructed of insulating material, metallic coatings on said members forming a plurality of separate elements and a plate on one member and an arm and a complementary plate connected thereto on the other member, said coatings being arranged on surfaces of revolution about the axis of relative rotation of the members and the adjacent surfaces of said members being closely spaced whereby said elements may successively be coupled capacitively to said first mentioned plate and signal energy may be transferred from said elements successively to said first plate, coatings on said other member on both sides of said arm and conductively connected together but separate from said arm and said complementary plate for providing a conducting surface constituting a capacitor plate common to all said elements except the one of said elements lying opposite said arm.

5. A device for scanning a plurality of sources of signal energy comprising a pair of parallel spaced plates, a series of pairs of conducting elements arranged on said plates, one member of each pair of elements being on one of the plates and the other member of the pair on the other plate, a pair of annular conducting plates, one plate of the pair being carried by one of said spaced plates and the other plate thereof by the other of said spaced plates, means arranged for rotation between said spaced plates and including at least one annular plate complementary to said first mentioned annular plates and a conducting arm connected thereto for rotation between the elements of the pairs of said series of elements whereby said pairs of elements may successively be coupled capacitively to said pair of annular plates upon rotation of said arm to transfer signal energy from the plurality of sources thereof successively to said spaced plates.

6. A device for scanning a plurality of sources of signal energy comprising a housing, a pair of spaced parallel plates of insulating material mounted in said housing, an intermediate plate of insulating material mounted for rotation between said spaced plates, a motor in said housing for driving said intermediate plate, a plurality of pairs of radial conducting fingers arranged on said spaced plates, one finger of each pair being on one plate and the other on the other plate, input connections for connecting the signal sources to said pairs of fingers, a pair of spaced annular conducting plates one annular plate on one of said spaced plates and the other on the other spaced plate, an output connection for conducting signal energy from said pair of annular plates, a pair of annular conducting plates on said intermediate plate opposite said first mentioned annular plates, means including a pair of conducting arms on said intermediate plate connected to respective ones of said annular plates thereon for capacitively coupling said pairs of fingers and said first mentioned pair of annular plates whereby the signal energy is conducted from said pairs of fingers successively to said first annular plates upon rotation of said intermediate plate.

7. A scanning device of the capacitive coupling type comprising one member of insulating material having a plurality of equally spaced conducting radial arms lying in a common surface of revolution, a second member of insulating material having a series of equally spaced conducting elements arranged in a surface of revolution spaced from said first mentioned surface and having the same axis, a conducting plate on said one member near the center thereof and connected to said arms, a complementary conducting plate on said second member mounted for relative rotation at a fixed distance from said first plate and insulated from said series of elements, conducting leads for said elements of said series, means for affording relative rotation between said members whereby upon rotation said arms transfer signal energy between said complementary plate and successive ones of said elements in said series, and a conducting lead for said complementary plate.

8. A scanning device of the capacitive coupling type comprising a pair of relatively rotatable flat plates of insulating material, said plates being rotatable about an axis normal to the flat surfaces thereof, metallic coatings on said plates forming a plurality of separate elements and a conducting plate on one of said flat plates and an arm and a complementary conducting plate connected to the arm on the other flat plate, said coatings being arranged on the flat surfaces of said flat plates, and the adjacent surfaces of said flat plates being closely spaced whereby said elements may successively be coupled capacitively to said first conducting plate and signal energy may be transferred successively between each of said elements and said first conducting plate, coatings on said other flat plate on both sides of said arm and conductively connected together but separate from said arm and said complementary conducting plate for providing a conducting surface constituting a capacitor plate common to all said elements except the one of said elements lying opposite said arm, and a conducting lead for said first conducting plate.

References Cited in the file of this patent
UNITED STATES PATENTS

| 1,671,143 | Campbell | May 29, 1928 |
| 2,223,513 | Fransson | Dec. 3, 1940 |
| 2,402,603 | Clark | June 25, 1946 |